United States Patent
Kim et al.

(10) Patent No.: US 10,848,362 B2
(45) Date of Patent: *Nov. 24, 2020

(54) METHOD FOR ELECTRICITY MEASUREMENT FOR V2V COMMUNICATIONS IN WIRELESS COMMUNICATION SYSTEM, AND DEVICE FOR SAME

(71) Applicant: LG ELECTRONICS INC., Seoul (KR)

(72) Inventors: Youngtae Kim, Seoul (KR); Hyukjin Chae, Seoul (KR); Hanbyul Seo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/671,034

(22) Filed: Oct. 31, 2019

(65) Prior Publication Data

US 2020/0145275 A1     May 7, 2020

Related U.S. Application Data

(63) Continuation of application No. 15/773,533, filed as application No. PCT/KR2016/013085 on Nov. 14, 2016, now Pat. No. 10,476,726.

(Continued)

(51) Int. Cl.
*H04L 27/26*     (2006.01)
*H04W 4/46*     (2018.01)
(Continued)

(52) U.S. Cl.
CPC ........ *H04L 27/2673* (2013.01); *H04L 27/265* (2013.01); *H04L 27/2607* (2013.01);
(Continued)

(58) Field of Classification Search
CPC ............ H04L 27/2673; H04L 27/2607; H04L 27/2611; H04L 27/265; H04L 5/0007;
(Continued)

(56) References Cited

U.S. PATENT DOCUMENTS 10,476,726 B2    11/2019 Kim et al.
10,511,422 B2*   12/2019 Kim ................... H04L 5/0053
(Continued)

FOREIGN PATENT DOCUMENTS

| WO | 2015126115 | 8/2015 |
| WO | 2015133816 | 9/2015 |
| WO | 2015163662 | 10/2015 |

OTHER PUBLICATIONS

United States Patent and Trademark Office U.S. Appl. No. 15/773,533, Notice of Allowance dated Jul. 1, 2019, 13 pages.

(Continued)

*Primary Examiner* — Duc C Ho
(74) *Attorney, Agent, or Firm* — Lee, Hong, Degerman, Kang & Waimey

(57) ABSTRACT

The present invention relates to a method for electricity measurement by a vehicle-to-vehicle (V2V) device for V2V communications in a wireless communication system and to a device therefor. In particular, the present invention includes the steps of: receiving at least one synchronization signal for V2V through a physical sidelink broadcast channel (PSBCH); and measuring received electricity from said at least one synchronization signal if the ID of said at least one synchronization signal is linked to a demodulation reference signal (DMRS) sequence having, applied thereto, an orthogonal cover code (OCC) having one fixed value, wherein the measurement is performed by averaging for each ID of said at least one synchronization signal.

10 Claims, 11 Drawing Sheets

Related U.S. Application Data

(60) Provisional application No. 62/254,715, filed on Nov. 13, 2015, provisional application No. 62/291,576, filed on Feb. 5, 2016, provisional application No. 62/374,706, filed on Aug. 12, 2016.

(51) Int. Cl.
| | |
|---|---|
| *H04W 4/70* | (2018.01) |
| *H04W 24/10* | (2009.01) |
| *H04W 72/04* | (2009.01) |
| *H04W 8/00* | (2009.01) |
| *H04L 5/00* | (2006.01) |

(52) U.S. Cl.
CPC ........... *H04L 27/2611* (2013.01); *H04W 4/46* (2018.02); *H04W 4/70* (2018.02); *H04W 24/10* (2013.01); *H04W 72/0446* (2013.01); *H04L 5/0007* (2013.01); *H04W 8/005* (2013.01)

(58) Field of Classification Search
CPC ......... H04W 4/46; H04W 4/70; H04W 24/10; H04W 72/0446; H04W 8/005
See application file for complete search history.

(56) References Cited

U.S. PATENT DOCUMENTS

| | | |
|---|---|---|
| 2015/0271846 A1 | 9/2015 | Kowalski et al. |
| 2015/0319751 A1 | 11/2015 | Gaal et al. |
| 2018/0212733 A1 | 7/2018 | Khoryaev et al. |
| 2019/0222460 A1 | 7/2019 | Kim et al. |

OTHER PUBLICATIONS

PCT International Application No. PCT/KR2016/013085, Written Opinion of the International Searching Authority dated Feb. 27, 2017, 16 pages.

* cited by examiner

-- PRIOR ART--

--PRIOR ART--
FIG. 2
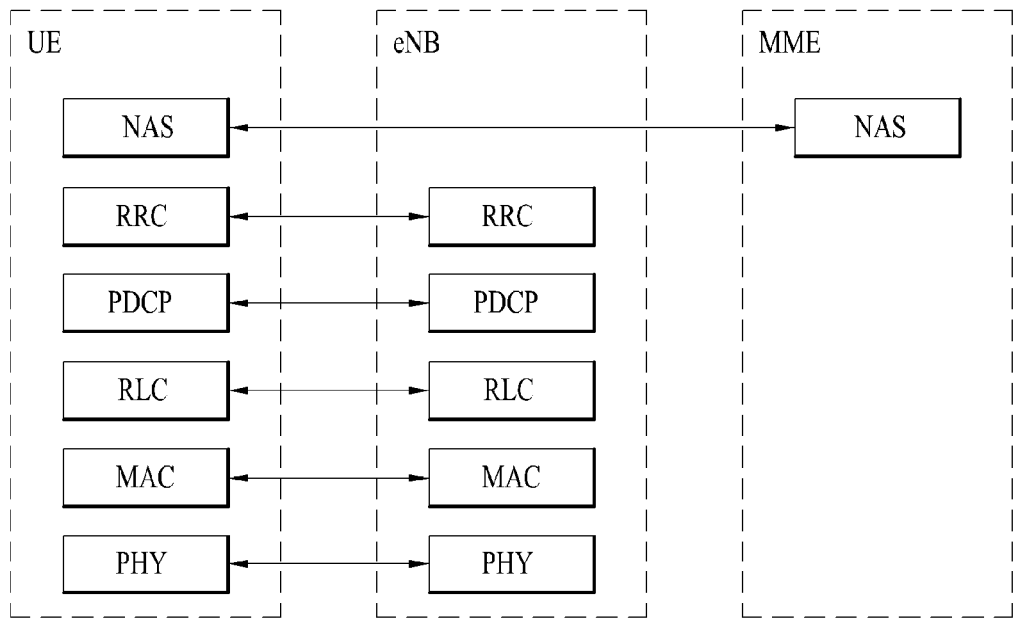
(a) Control plane protocol stack
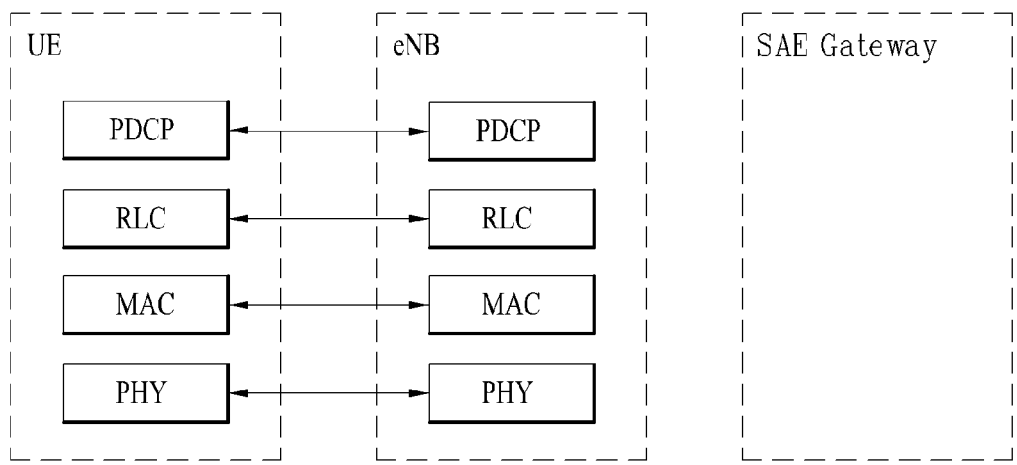
(b) User plane protocol stack

--PRIOR ART--

--PRIOR ART--

--PRIOR ART--

--PRIOR ART--
FIG. 8
(a)
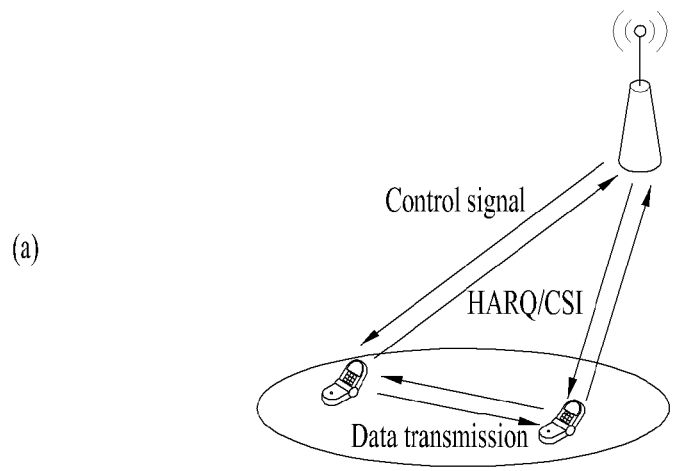
(b)
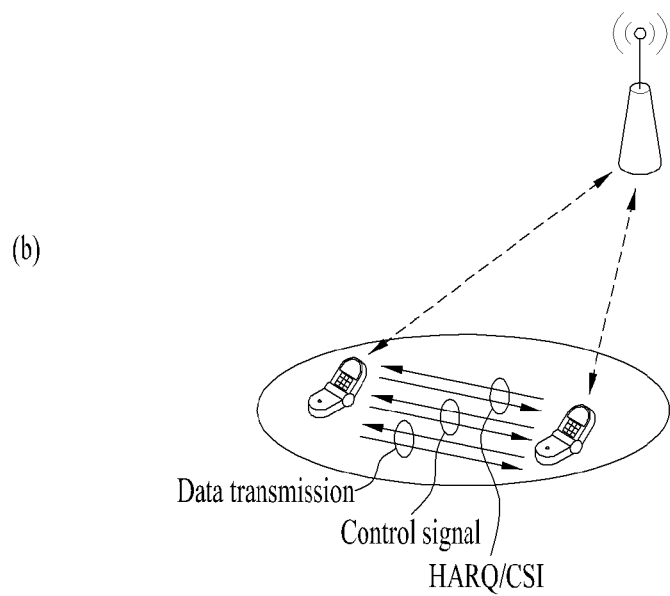

--PRIOR ART--

--PRIOR ART--

--PRIOR ART--

METHOD FOR ELECTRICITY MEASUREMENT FOR V2V COMMUNICATIONS IN WIRELESS COMMUNICATION SYSTEM, AND DEVICE FOR SAME

CROSS-REFERENCE TO RELATED APPLICATIONS

This application is a continuation of U.S. patent application Ser. No. 15/773,533, filed on May 3, 2018, now U.S. Pat. No. 10,476,726, which is the National Stage filing under 35 U.S.C. 371 of International Application No. PCT/KR2016/013085, filed on Nov. 14, 2016, which claims the benefit of U.S. Provisional Applications No. 62/254,715, filed on Nov. 13, 2015, 62/291,576, filed on Feb. 5, 2016 and 62/374,706, filed on Aug. 12, 2016, the contents of which are all hereby incorporated by reference herein in their entirety.

TECHNICAL FIELD

The present invention relates to a wireless communication system, and more particularly, to a method of measuring power for vehicle-to-vehicle (V2V) communication in a wireless communication system and device for the same.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

DISCLOSURE OF THE INVENTION

Technical Task

Based on the above discussion, a power measurement method for V2V communication in a wireless communication system and device therefor are provided.

It will be appreciated by persons skilled in the art that the objects that could be achieved with the present invention are not limited to what has been particularly described hereinabove and the above and other objects that the present invention could achieve will be more clearly understood from the following detailed description.

Technical Solutions

To achieve these objects and other advantages, in an aspect of the present invention, provided herein is a method of measuring power for vehicle-to-vehicle (V2V) communication by a V2V device in a wireless communication system, including: receiving one or more synchronization signals for the V2V communication through a physical sidelink broadcast channel (PSBCH); and when IDs of the one or more synchronization signals are interconnected with demodulation reference signal (DMRS) sequences to which an orthogonal cover code (OCC) with one fixed value is applied, measuring received power of the one or more synchronization signals. In this case, the measurement may be performed by averaging for each of the IDs of the one or more synchronization signals.

Additionally, the number of available synchronization signal IDs may be greater than the number of available DMRS sequences.

Additionally, the measurement may be performed except a synchronization signal allocated to a symbol adjacent to a DMRS and a synchronization signal allocated to a symbol adjacent to a symbol boundary.

Additionally, the PSBCH may further include a measurement field, and combinations of the measurement field and the DMRS sequences may be configured to be mapped to the IDs of the synchronization signals.

Additionally, the DMRS sequences may be comb-type sequences, and combinations of information indicating whether even mapping or odd mapping is applied to the DMRS sequences and the DMRS sequences may be configured to be mapped to the IDs of the synchronization signals.

Additionally, the number of available synchronization signal IDs may be limited to the number of available DMRS sequences.

Additionally, the measurement may be performed when a phase offset caused by a frequency error is greater than a predetermined value.

In another aspect of the present invention, provided herein is a method of receiving a signal for vehicle-to-vehicle (V2V) communication by a V2V device in a wireless communication system, including receiving a demodulation reference signal (DMRS) to which an orthogonal cover code (OCC) with two fixed values is applied for the V2V communication. When the DMRS has three symbols for the V2V communication, the OCC may depend on a predetermined discrete Fourier transform (DFT) matrix.

In a further aspect of the present invention, provided herein is a vehicle-to-vehicle (V2V) device for measuring power for V2V communication in a wireless communication system, including: a radio frequency unit; and a processor. In this case, the processor may be configured to: receive one or more synchronization signals for the V2V communication through a physical sidelink broadcast channel (PSBCH); and when IDs of the one or more synchronization signals are interconnected with demodulation reference signal (DMRS) sequences to which an orthogonal cover code (OCC) with one fixed value is applied, measure received power of the one or more synchronization signals. In this case, the measurement may be performed by averaging for each of the IDs of the one or more synchronization signals.

Advantageous Effects

According to the present invention, power measurement for V2V communication can be efficiently performed in a wireless communication system.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 illustrates structures of control and user planes of a radio interface protocol between a UE and E-UTRAN based on 3GPP radio access network standards.

FIG. 8 is a reference diagram for explaining D2D (UE-to-UE) communication.

BEST MODE FOR INVENTION

Figure 1:
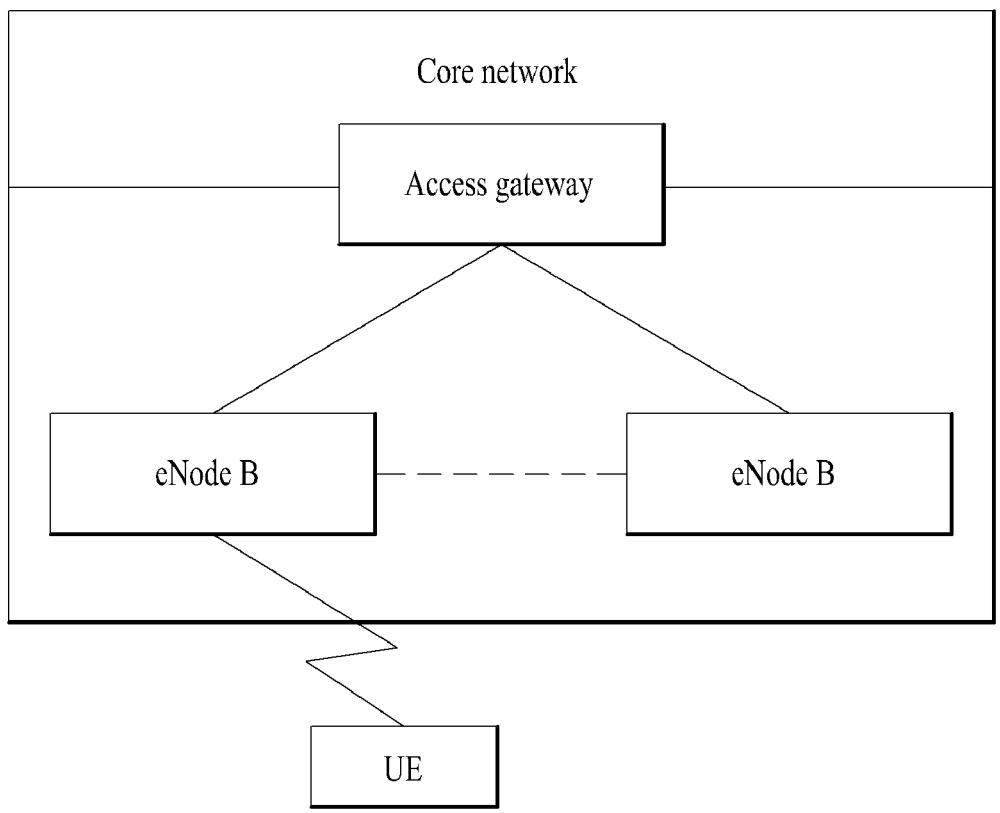
FIG. 1 is a schematic diagram of an E-UMTS network structure as one example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, reconfiguration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
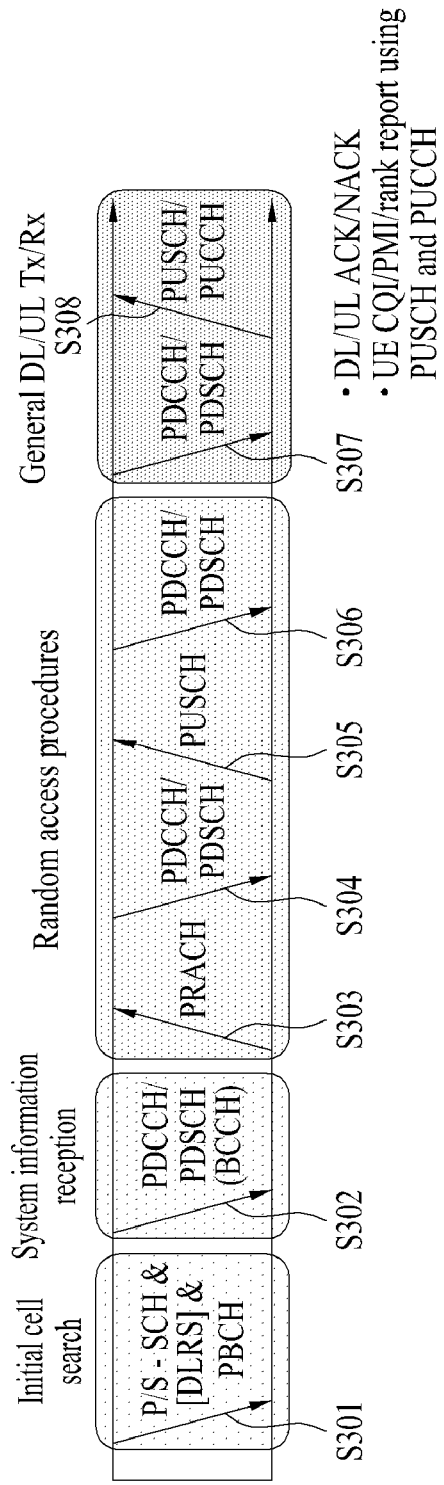
FIG. 3 illustrates physical channels used in the 3GPP LTE system and a general signal transmission method using the same.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
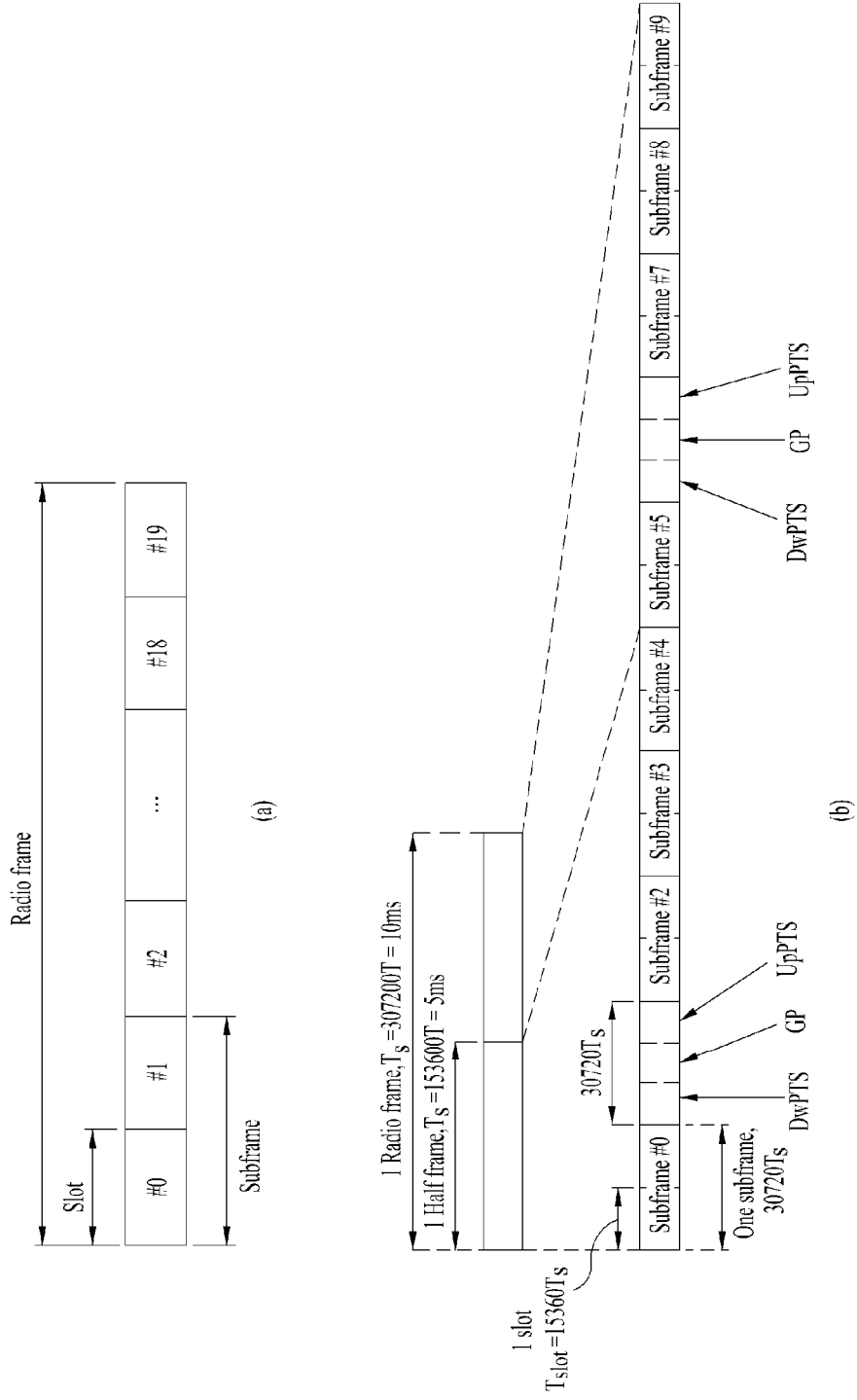
FIG. 4 illustrates the structure of a radio frame used in the LTE system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000\times2048)$, and the other region is configured for the guard period.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
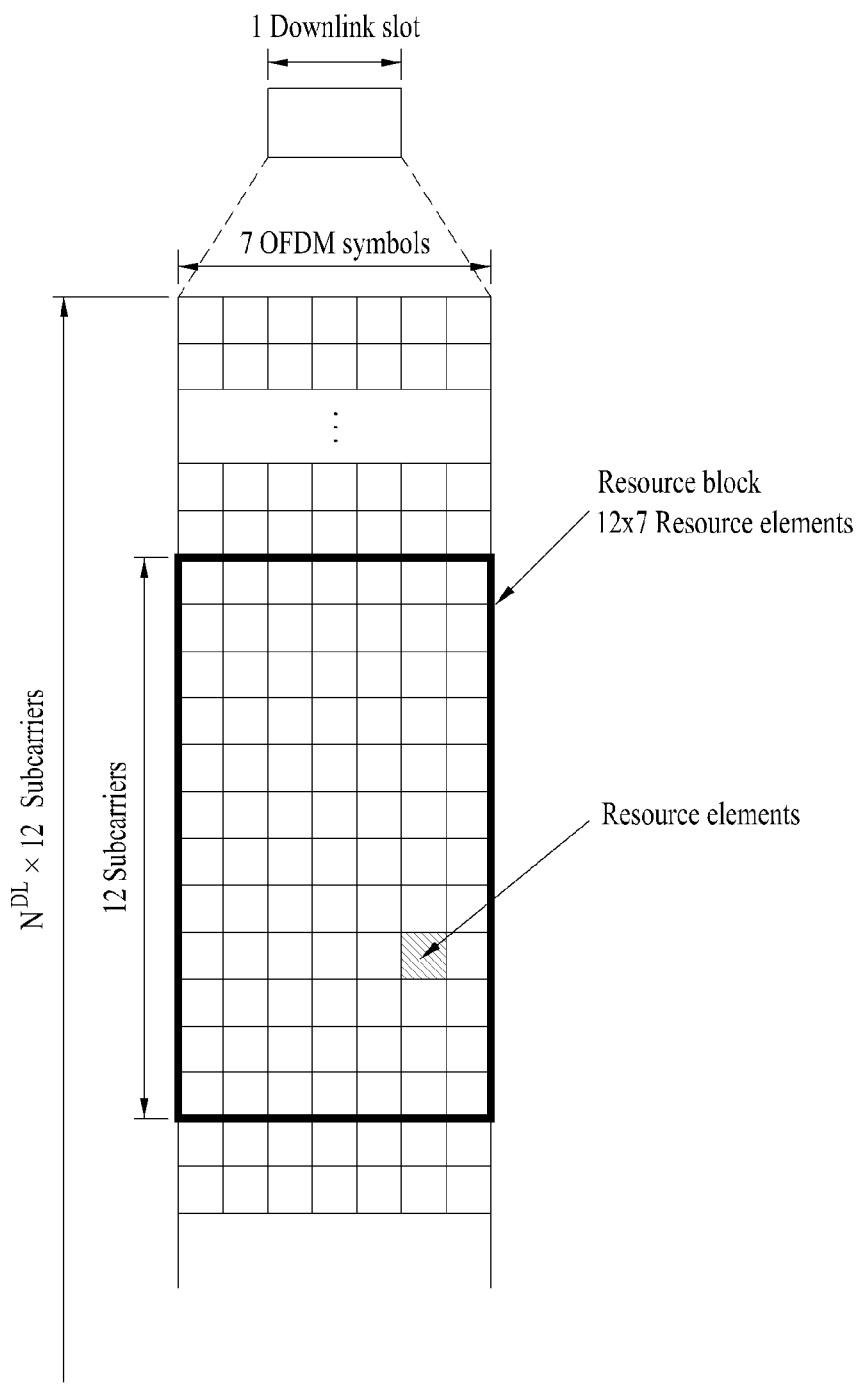
FIG. 5 illustrates the resource grid for a downlink slot.

FIG. 5 illustrates a resource grid for a downlink slot.

Referring to FIG. 5, a DL slot includes $N_{symb}^{DL}$ OFDM symbols in a time domain and $N_{RB}^{DL}$ resource blocks in a frequency domain. Since each of the resource blocks includes $N_{SC}^{RB}$ subcarriers, the DL slot includes $N_{RB}^{DL} \times N_{SC}^{RB}$ subcarriers in the frequency domain. Although FIG. 5 shows an example in which the DL slot includes 7 OFDM symbols and the resource block includes 12 subcarriers, the present invention is not limited thereto. For instance, the number of OFDM symbols included in the DL slot can vary depending to a length of a cyclic prefix (CP).

Each element on a resource grid is referred to as a resource element (RE) and a single resource element is indicated by one OFDM symbol index and one subcarrier index. A single RB is configured with $N_{symb}^{DL} \times N_{SC}^{RB}$ resource elements. The number ($N_{RB}^{DL}$) of resource blocks included in the DL slot depends on a DL transmission bandwidth configured in a cell.

Figure 6:
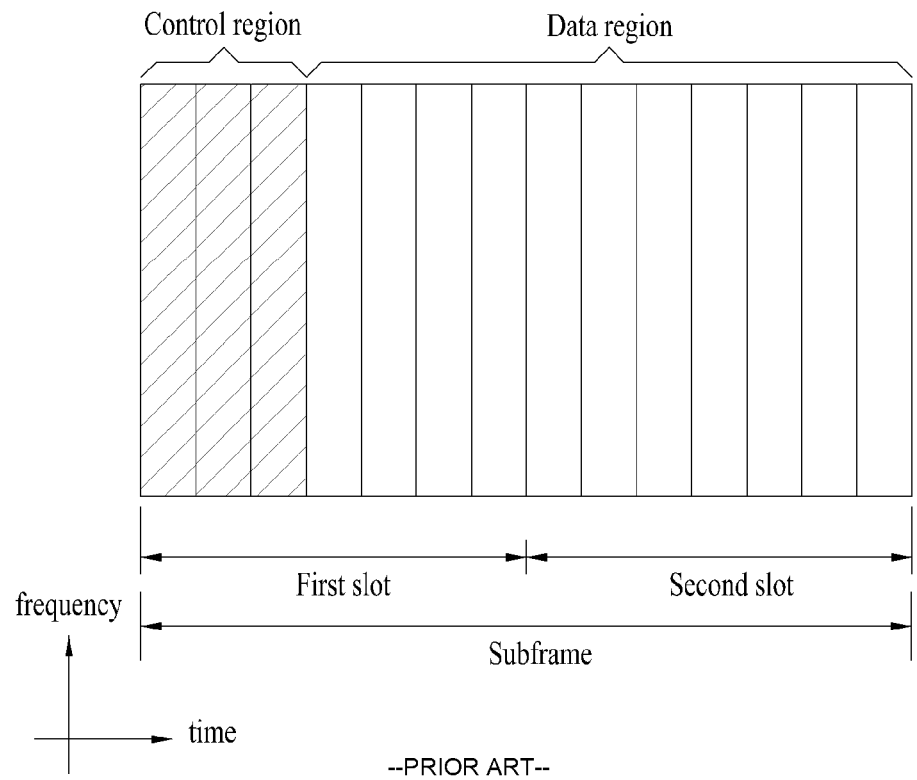
FIG. 6 illustrates the structure of a downlink radio frame used in the LTE system.

FIG. 6 illustrates a structure of a downlink radio frame.

Referring to FIG. 6, up to 3 (or 4) OFDM symbols located at a head part of a first slot of a subframe correspond to a control region to which a control channel is assigned. And, the rest of OFDM symbols correspond to a data region to which PDSCH (physical downlink shared channel) is assigned. For example, DL control channels used in the LTE system may include a PCFICH (physical control format indicator channel), a PDCCH (physical downlink control channel), a PHICH (physical hybrid ARQ indicator channel) and the like. The PCFICH is transmitted on a first OFDM symbol of a subframe and carries information on the number of OFDM symbols in the subframe used for control channel transmission. The PHICH carries an HARQ ACK/NACK (hybrid automatic repeat request acknowledgment/negative-acknowledgment) signal in response to UL transmission.

Control information transmitted on the PDCCH is called DCI (downlink control information). The DCI includes resource allocation information and other control information for a user equipment or a user equipment group. For instance, the DCI may include UL/DL scheduling information, UL transmission (Tx) power control command and the like.

The PDCCH carries transmission format and resource allocation information of a DL-SCH (downlink shared channel), transmission format and resource allocation information of a UL-SCH (uplink shared channel), paging information on a PCH (paging channel), system information on a DL-SCH, resource allocation information of a higher-layer control message such as a random access response transmitted on a PDSCH, a Tx power control command set for individual user equipments in a user equipment group, a Tx power control command, activation indication information of a VoIP (voice over IP) and the like. A plurality of PDCCHs may be transmitted in a control region. A user equipment can monitor a plurality of PDCCHs. The PDCCH is transmitted on aggregation of one or more consecutive CCEs (control channel elements). In this case, the CCE is a logical assignment unit used in providing the PDCCH with a coding rate based on a radio channel state. The CCE corresponds to a plurality of REGs (resource element groups). The PDCCH format and the number of PDCCH bits are determined depending on the number of CCEs. A base station determines the PDCCH format in accordance with DCI to be transmitted to a user equipment and attaches CRC (cyclic redundancy check) to control information. The CRC is masked with an identifier (e.g., RNTI (radio network temporary identifier)) in accordance with an owner or a purpose of use. For instance, if a PDCCH is provided for a specific user equipment, CRC may be masked with an identifier (e.g., C-RNTI (cell-RNTI)) of the corresponding user equipment. If a PDCCH is provided for a paging message, CRC may be masked with a paging identifier (e.g., P-RNTI (paging-RNTI)). If a PDCCH is provided for system information (particularly, SIC (system information block)), CRC may be masked with an SI-RNTI (system information-RNTI). In addition, if a PDCCH is provided for a random access response, CRC may be masked with an RA-RNTI (random access-RNTI).

Figure 7:
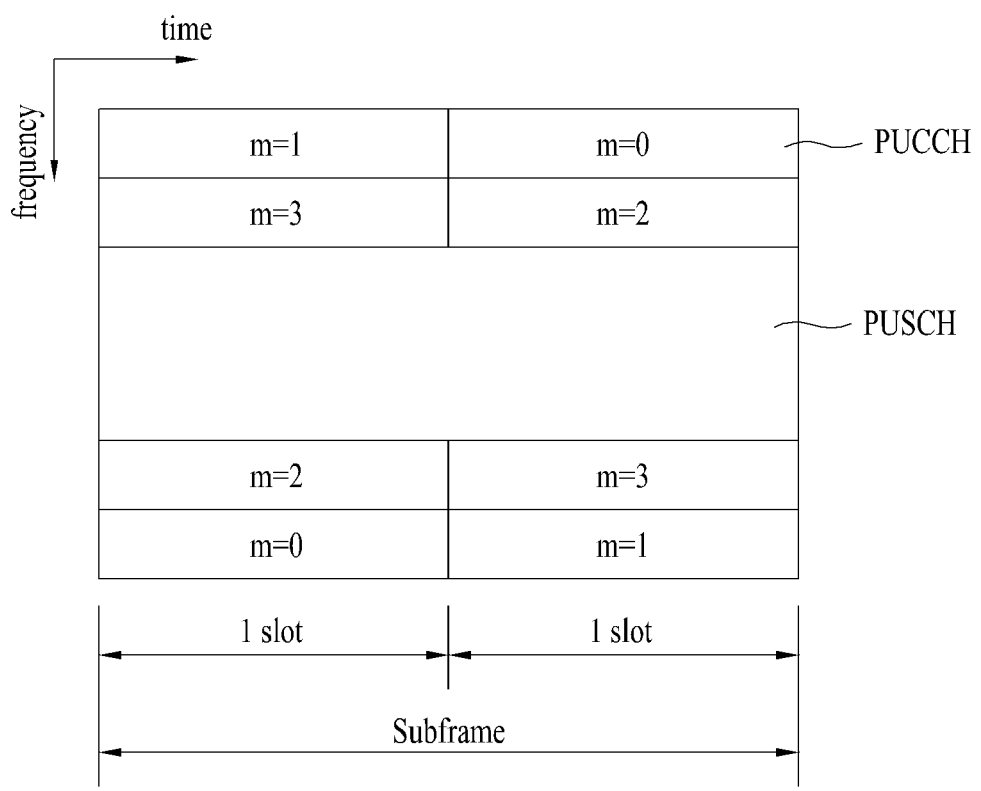
FIG. 7 illustrates the structure of an uplink subframe used in the LTE system.

FIG. 7 illustrates a structure of an uplink subframe used in an LTE system.

Referring to FIG. 7, an uplink subframe includes a plurality (e.g., 2 slots) of slots. Each of the slots may include a different number of SC-FDMA symbols depending on a length of CP. The UL subframe may be divided into a data region and a control region in the frequency domain. The data region includes a PUSCH and is used to transmit such a data signal as audio and the like. The control region includes a PUCCH and is used to transmit UCI (uplink control information). The PUCCH includes an RB pair located at both ends of the data region on a frequency axis and is hopped on a slot boundary.

The PUCCH can be used to transmit the following control information.

- SR (scheduling request): This is information used to request a UL-SCH resource and is transmitted using an OOK (on-off keying) scheme.
- HARQ ACK/NACK: This is a response signal in response to a DL data packet on a PDSCH and indicates whether the DL data packet has been successfully received. 1-bit ACK/NACK is transmitted as a response to a single downlink codeword and 2-bit ACK/NACK is transmitted as a response to two downlink codewords.
- CSI (channel state information): This is feedback information on a downlink channel. The CSI includes a channel quality indicator (CQI). MIMO (multiple input multiple output) related feedback information includes a rank indicator (RI), a precoding matrix indicator (PMI), a precoding type indicator (PTI) and the like. 20-bit is used in each subframe.

The amount of control information (UCI) that a user equipment can transmit in a subframe depends on the number of SC-FDMA symbols available for transmission of the control information. The SC-FDMA symbols available for the transmission of the control information correspond to the rest of SC-FDMA symbols except SC-FDMA symbols used for transmitting a reference signal in the subframe. In case of a subframe in which a sounding reference signal (SRS) is configured, the last SC-FDMA symbol of the subframe is excluded from the SC-FDMA symbols available for the transmission of the control information. The reference signal is used for coherent detection of a PUCCH.

Hereinafter, D2D (UE-to-UE) communication will be described.

A D2D communication scheme can be mainly classified as a scheme supported by a network/coordination station (e.g., base station) and a scheme not supported by the network/coordination station.

Referring to FIG. 8, FIG. 8 (a) illustrates a scheme in which the network/coordination station intervenes in transmission and reception of control signals (e.g., grant message), HARQ, channel state information, etc. and user equipments that perform D2D communication transmit and receive data only. On the other hand, FIG. 8 (b) illustrates a scheme in which the network provides minimum information (e.g., D2D connection information available in a corresponding cell) only but the user equipments that perform D2D communication establish links to transmit and receive data.

Figure 9:
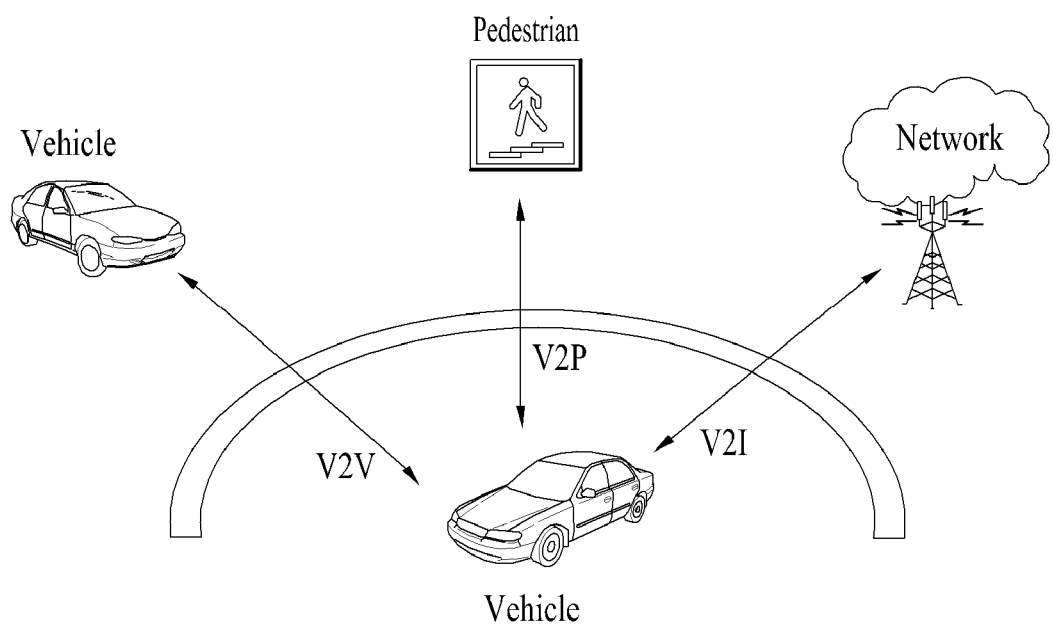
FIG. 9 is a reference diagram for explaining a V2V scenario.

FIG. 9 is a diagram illustrating a V2X (vehicle to everything) communication environment.

If a vehicle accident occurs, many lives are lost, and serious property damage is caused. Thus, the demand for a technology capable of securing safety of pedestrians as well as safety of people in a vehicle has been increased. In addition, a technology based on hardware and software dedicated to the vehicle has been grafted onto the vehicle.

Recently, the LTE-based V2X (vehicle-to-everything) communication technology, which has been evolved from 3GPP, reflects the tendency in which the information technology (IT) is grafted onto the vehicle. A connectivity function is applied to some kinds of vehicles, and efforts are continuously made to research and develop vehicle-to-vehicle (V2V) communication, vehicle-to-infrastructure (V2I) communication, vehicle-to-pedestrian (V2P) communication, and vehicle-to-network (V2N) communication with the evolution of communication functions.

According to V2X communication, a vehicle consistently broadcasts information on its own locations, speeds, directions, etc. After receiving the broadcasted information, a nearby vehicle utilizes the information for accident prevention by recognizing movements of other adjacent vehicles.

That is, in a similar manner that an individual person carries a user equipment such as a smartphone, a smartwatch or the like, a specific type of user equipment (UE) can be installed in each vehicle. Here, a UE installed in a vehicle means a device that actually receives communication services from a communication network. For example, the UE installed in the vehicle can be accessed to an eNB in E-UTRAN and provided with communication services.

However, there are various items that should be considered for a process for implementing V2X communication in a vehicle. This is because astronomical costs are required for the installation of traffic safety facilities such as a V2X base station and the like. That is, to support V2X communication on all roads where the vehicle can move, it is necessary to install hundreds or thousands of V2X base stations or more. Moreover, since each network node accesses the Internet or a centralized control server using a wired network basically for stable communication with a server, installation and maintenance costs for the wired network are also high.

Hereinafter, a signal to which an orthogonal cover code (OCC) for compensating for a frequency offset error in a V2V scenario is applied will be described. Although the present invention is described based on the V2V scenario for convenience of description, the invention can also be applied to other scenarios including a D2D scenario, etc.

Figure 10A:
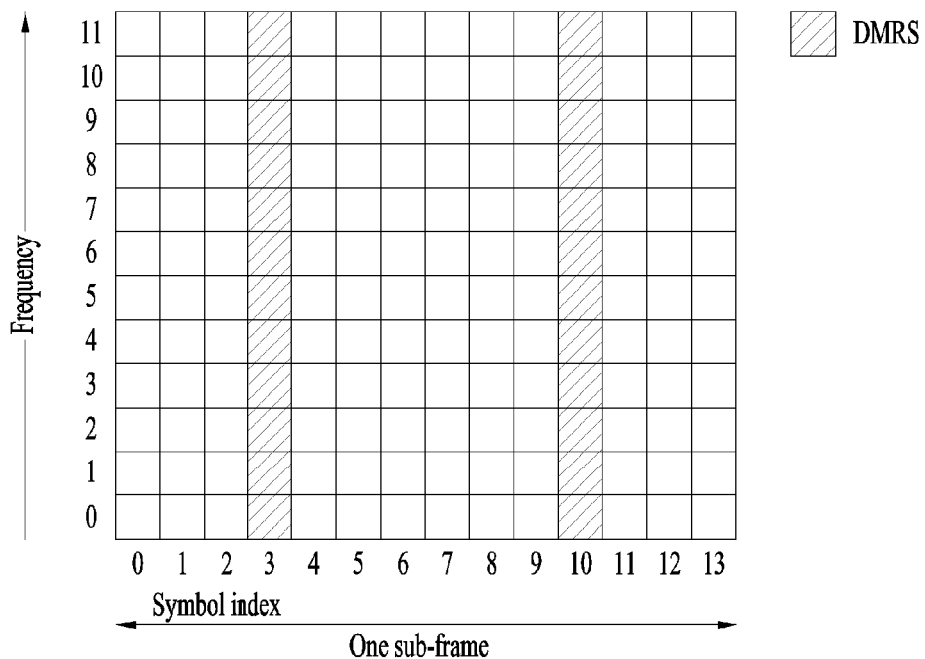
FIG. 10A and FIG. 10B illustrate the structure of a demodulation reference signal (DMRS) of the LTE system.
Figure 10B:
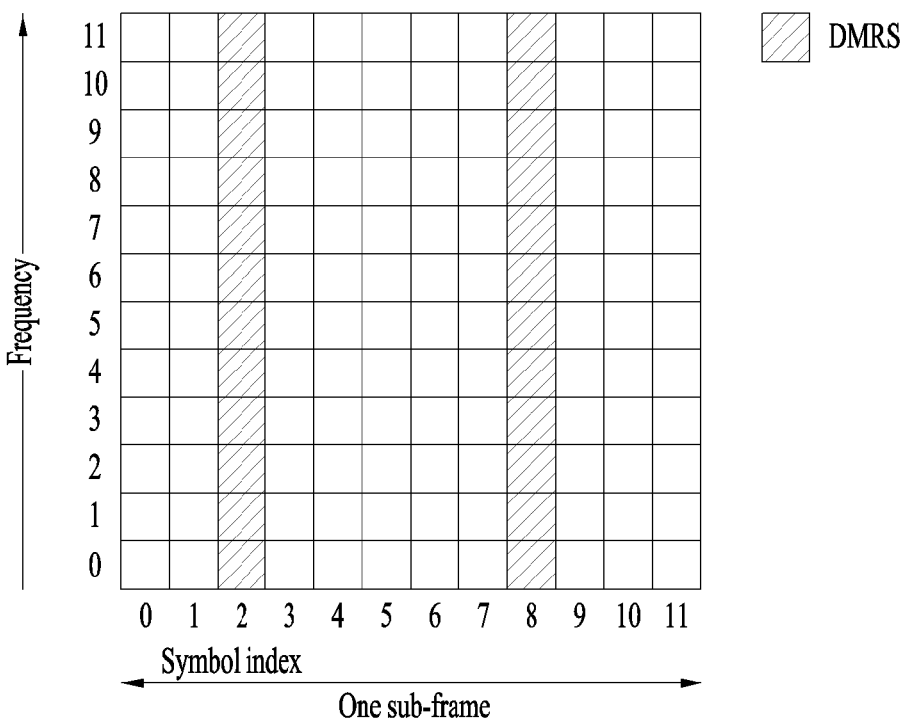

In V2X communication, the subframe structure designed for the conventional LTE physical uplink shared channel (PUSCH) can be used. FIG. 10a shows a DMRS structure in a subframe with the normal CP of the current LTE system, and FIG. 10b shows a DMRS structure in a subframe with an extended CP of the current LTE system. Basically, according to the DMRS design shown in FIG. 10a or FIG. 10b, a DMRS is designed such that it is mapped to all resource elements of several OFDM symbols in a subframe in consideration of a peak-to-average power ratio (PAPR). In V2V communication, a receiver can be installed in a vehicle with the advance of the technology. Hence, the PARR may not cause any serious problem. Thus, the present invention concentrates on DMRS design considering a frequency offset rather than the PARR.

In the V2V scenario currently discussed in the LTE system, 5.9 GHz, which is used for dedicated short range communication (DSRC), can also be considered as a center frequency target.

Currently, the requirement of an initial frequency offset is 10 ppm (pulses per minute), and the requirement of a residual frequency offset is +/−0.1 ppm. Assuming that two vehicles are synchronized with each other based on a signal provided by a common eNB, a common vehicle, or another common source, a frequency offset difference between the two vehicles may be +/−0.2 ppm. If a vehicle establishes synchronization with a different vehicle which has established synchronization, it might say that the vehicle has two-hop synchronization. In this case, if two vehicles establish synchronization through the different vehicle, the two vehicles have two-hop synchronization, and a frequency offset difference therebetween may be +/−0.4 ppm. If two vehicles establish three-hop synchronization through the same vehicle, a frequency offset difference therebetween may be +/−0.6 ppm.

Assuming that a DMRS is designed as shown in FIG. 10a and the two columns of DMRS are used to compensate for a frequency offset, it is necessary to measure the amount of a phase offset due to increase in the frequency offset during 0.5 ms. This is because the frequency offset can be estimated based on the amount of the phase offset.

Table 3 below shows the amount of increase in a phase offset during 0.5 ms depending on the center frequency or multi-hop synchronization.

TABLE 3

| Carrier Frequency | Phase increment over 0.5 ms (DMRS interval) | | |
|---|---|---|---|
| | 0.1 ppm | 0.4 ppm | 0.6 ppm |
| 700 MHz | 70 Hz => 0.22 rad | 280 Hz => 0.88 rad | 420 Hz => 1.32 rad |
| 2 GHz | 200 Hz => 0.63 rad | 800 Hz => 2.51 rad | 1200 Hz => 3.77 rad > pi |
| 5.9 GHz | 590 Hz => 1.85 rad | | |

Referring to Table 3, at the center frequency of 700 MHz, even though the frequency offset is +/−0.6 ppm, the increase in the phase offset does not exceed the value of pi ($\pi$). Thus, at the center frequency of 700 MHz, the current DMRS structure can be used in adjusting the frequency offset. However, when the center frequency increases to 2 GHz while the same frequency offset of +/−0.6 ppm is maintained, the phase offset value exceeds the value of pi. Hence, a problem may occur in compensating for the frequency offset using the current DMRS structure. Moreover, at the center frequency of 5.9 GHz, even when the frequency offset is only +/−0.2 ppm, the phase offset value exceeds the value of pi. Hence, it is difficult to compensate the frequency offset value using the current DMRS structure.

In fact, the frequency offset of +/−0.2 ppm may correspond to the minimum frequency offset value in V2V. That is, when two vehicles are synchronized with respect to a single vehicle or an eNB, the two vehicles should assume that the minimum frequency offset is equal to or greater than +/−0.2 ppm in order to communicate with each other. In this case, if the center frequency is 5.9 GHz, it is difficult to compensate for the frequency offset using the current DMRS structure.

The simulation results in Table 4 shows the amount of the phase offset when it is assumed that the frequency offset is x ppm and the DMRS is mapped to at an interval of y symbols.

It can be seen from Table 4 that in the case of the frequency offset of +/−0.2 ppm, the DMRS needs to be mapped at an interval of five symbols. In the case of the frequency offset of +/−0.4 ppm, the DMRS needs to be mapped at an interval of two symbols. When the frequency offset is equal to or greater than +/−0.6 ppm, the DMRS should be mapped at an interval of one symbol to compensate for the frequency offset.

Accordingly, in this case, one OCC with a fixed value should be used instead of a plurality of OCCs.

If one code with a fixed value is used as the OCC, the number of DMRS sequences is reduced by half. In addition, in the case of a channel carrying a PSSS and an SSSS such as a physical sidelink broadcast channel (PSBCH), a synchronization signal ID is interconnected with a DMRS sequence. Thus, a receiving UE can obtain the synchronization signal ID by performing blind detection of the DMRS sequence. However, as described above, in the case of using the OCC with the fixed value, the number of DMRS sequences is reduced by half, and thus it may be smaller than the number of synchronization signal IDs. Currently, since two root indices are used for the PSSS of the PSBCH and 168 IDs are used for the SSSS, the total number of available IDs of synchronization signals becomes 336. In addition, considering that 30 base sequences, 8 CSs and 2 OCCs are used for DMRS sequences for the PSBCH, it can be seen that there is a total of 480 sequences. However, in this case, since the number of available sequences is reduced as 240 due to use of the OCC with the fixed value, all the synchronization signal IDs cannot be accommodated.

TABLE 4

|  | 0.1 ppM | 0.2 ppm | 0.3 ppm | 0.4 ppm | 0.5 ppm | 0.6 ppm | 0.7 ppm | 0.8 ppm | 0.9 ppm | 1.0 ppm |
|---|---|---|---|---|---|---|---|---|---|---|
| 1symbol | 0.0714286 | 0.264791 | 0.529583 | 0.794374 | 1.059165 | 1.323957 | 1.588748 | 1.853539 | 2.118331 | 2.383122 | 2.647913 |
| 2symbol | 0.1428571 | 0.529583 | 1.059165 | 1.588748 | 2.118331 | 2.647913 | 3.1775 | 3.70708 | 4.23666 | 4.76624 | 5.29583 |
| 3symbol | 0.2142857 | 0.794374 | 1.588748 | 2.383122 | 3.1775 | 3.97187 | 4.76624 | 5.56062 | 6.35499 | 7.14937 | 7.94374 |
| 4symbol | 0.2857143 | 1.059165 | 2.118331 | 3.1775 | 4.23666 | 5.29583 | 6.35499 | 7.41416 | 8.47332 | 9.53249 | 10.5917 |
| 5symbol | 0.3571429 | 1.323957 | 2.647913 | 3.97187 | 5.29583 | 6.61978 | 7.94374 | 9.2677 | 10.5917 | 11.9156 | 13.2396 |
| 6symbol | 0.4285714 | 1.588748 | 3.1775 | 4.76624 | 6.35499 | 7.94374 | 9.53249 | 11.1212 | 12.71 | 14.2987 | 15.8875 |
| 7symbol | 0.5 | 1.853539 | 3.70708 | 5.56062 | 7.41416 | 9.2677 | 11.1212 | 12.9748 | 14.8283 | 16.6819 | 18.5354 |
| 8symbol | 0.5714286 | 2.118331 | 4.23666 | 6.35499 | 8.47332 | 10.5917 | 12.71 | 14.8283 | 16.9466 | 19.065 | 21.1833 |
| 9symbol | 0.6428571 | 2.383122 | 4.76624 | 7.14937 | 9.53249 | 11.9156 | 14.2987 | 16.6819 | 19.065 | 21.4481 | 23.8312 |
| 10symbol | 0.7142857 | 2.647913 | 5.29583 | 7.94374 | 10.5917 | 13.2396 | 15.8875 | 18.5354 | 21.1833 | 23.8312 | 26.4791 |
| 11symbol | 0.7857343 | 2.912705 | 5.82541 | 8.73811 | 11.6508 | 14.5635 | 17.4762 | 20.3889 | 23.3016 | 26.2143 | 29.127 |
| 12symbol | 0.8571429 | 3.1775 | 6.35499 | 9.53249 | 12.71 | 15.8875 | 19.065 | 22.2425 | 25.42 | 28.5975 | 31.775 |
| 13symbol | 0.9285714 | 3.44229 | 6.88457 | 10.3269 | 13.7691 | 17.2114 | 20.6537 | 24.096 | 27.5383 | 30.9806 | 34.4229 |
| 14symbol | 1 | 3.70708 | 7.41416 | 11.1212 | 14.8283 | 18.5354 | 22.2425 | 25.9495 | 29.6566 | 33.3637 | 37.0708 |

The DMRS design with an interval of seven OFDM symbols, which is used for UL transmission in the current LTE system, is not suitable for the system with a large frequency offset. That is, it is possible to support the frequency offset adjustment by reducing the OFDM symbol interval between DMRSs.

Meanwhile, an orthogonal cover code (OCC) has been used for the current uplink DMRS. Since the DMRS is mapped to two OFDM symbols, code [1 1] and code [1 −1] are used as the current OCC.

However, considering the frequency offset and Doppler effect, a receiving UE may be unable to segment the OCC. When two OFDM symbols are used for DMRSs, if a phase change caused by an offset during the time interval from a DMRS to a next neighboring DMRS is greater than π, the receiving UE cannot clearly understand the phase change. For example, if the phase change is 190 degrees, the receiving UE may not determine whether the phase change is 190 or 170 degrees. However, if codes [1 1] and [1 −1] are used, the UE should segment a signal into two codes: a code where the difference of π is reflected and a code where the difference of π is not reflected, during the time interval from the DMRS to the next neighboring DMRS. To this end, the phase change due to the offset should be less than π/2. However, when a UE moving at high speed as in V2X communication is set as a target, the phase change caused by the Doppler effect and frequency offset may significantly increase, and thus the OCC may not operate correctly.

Accordingly, the present invention proposes first to eighth methods to overcome the insufficient number of DMRS sequences to be matched with synchronization signal IDs.

First Method

As the first method of the present invention, provided is a method for directly measuring received power of a synchronization signal (e.g., PSSS and/or SSSS) in a V2X communication scenario. For this measurement, averaging or filtering is performed per ID of a detected PSSS or SSSS.

According to D2D communication defined in Release 12/13 in the LTE system, a PSBCH DMRS has been used for synchronization signal measurement, particularly to measure signals used by D2D communication UEs only. If it is assumed that all UEs can use a PSBCH in V2X communication, it is possible to directly measure a synchronization signal as in the first method. Exceptionally, in this case, power of a synchronization signal adjacent to the DMRS or power of a synchronization signal transmitted in the symbol adjacent to a subframe boundary may not be measured. This is because since inter-cell interference (ICI) may occur due to a power amplifier transient, it is preferable to exclude the corresponding symbol from the measurement.

Second Method

The above-described first method has a disadvantage in that the new measurement should be introduced. Hence, to maintain a method of measuring a PSBCH DMRS as in the conventional sidelink-reference signal received power (S-RSRP) measurement, a method of separating measurement when SLSSs (PSSS/SSSS) have different IDs in spite of the same DMRS is provided as the second method. For example, when SLSS IDs are different from each other in spite of the same DMRS, it is proposed not to perform averaging/filtering together.

That is, in case an OCC cannot be used due to a high frequency offset, DMRSs may not be distinguished from each other by the OCC, and the DMRSs may be identical to each other even though SLSS IDs are different. In this case, if DMRS measurement averaging/filtering is performed on identical SLSS IDs only, it is possible to prevent erroneous S-RSRP results due to synthesized measurement.

Third Method

According to the third method of the present invention, 12 cyclic shifts are used to map a DMRS sequence to a synchronization signal ID. Specifically, among the 12 cyclic shifts, only 8 cyclic shifts are selected and used in the LTE system, whereas all of the 12 cyclic shifts can be used in the V2X scenario.

Fourth Method

According to the fourth method of the present invention, an N-bit measurement field (where N is a natural number) is added to a PSBCH, and combination of the measurement field and DMRS sequences are mapped to synchronization signal IDs. Here, N may be 1. For example, when an OCC cannot be used, one bit where IDs are distinguished by the OCC may be included in the PSBCH. By doing so, a UE may perform measurement averaging only when measurement fields are the same.

Fifth Method

According to the fifth method of the present invention, an OCC (code [1 1] and code [1 −1]) is applied to a PSSS and/or SSSS, and combinations of the OCC applied to sidelink synchronization signals and DMRS sequences are mapped to synchronization signal IDs.

Figure 11A:
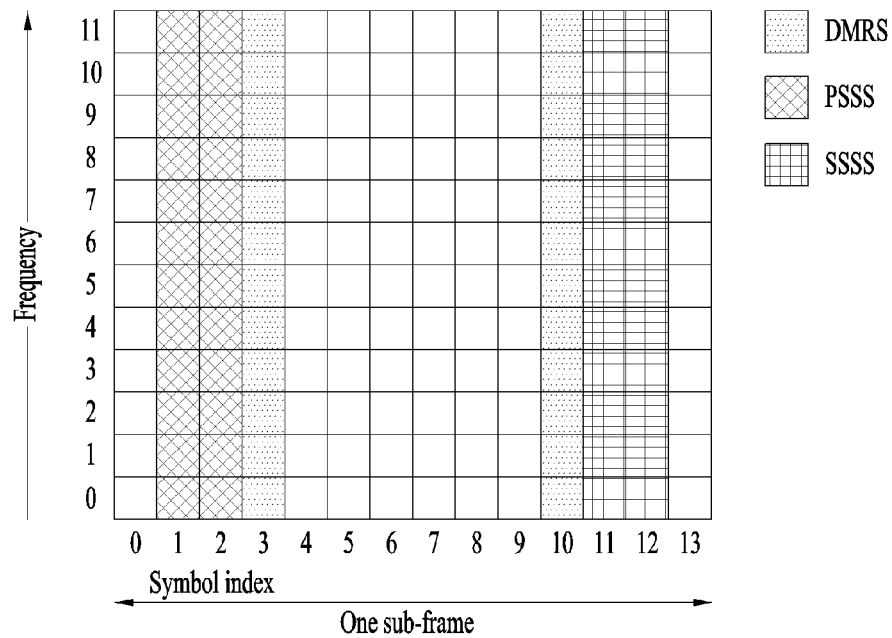
FIG. 11A and FIG. 11B are a reference diagram for explaining the structures of a primary sidelink synchronization signal (PSSS) and a secondary sidelink synchronization signal (SSSS) of the LTE system.
Figure 11B:
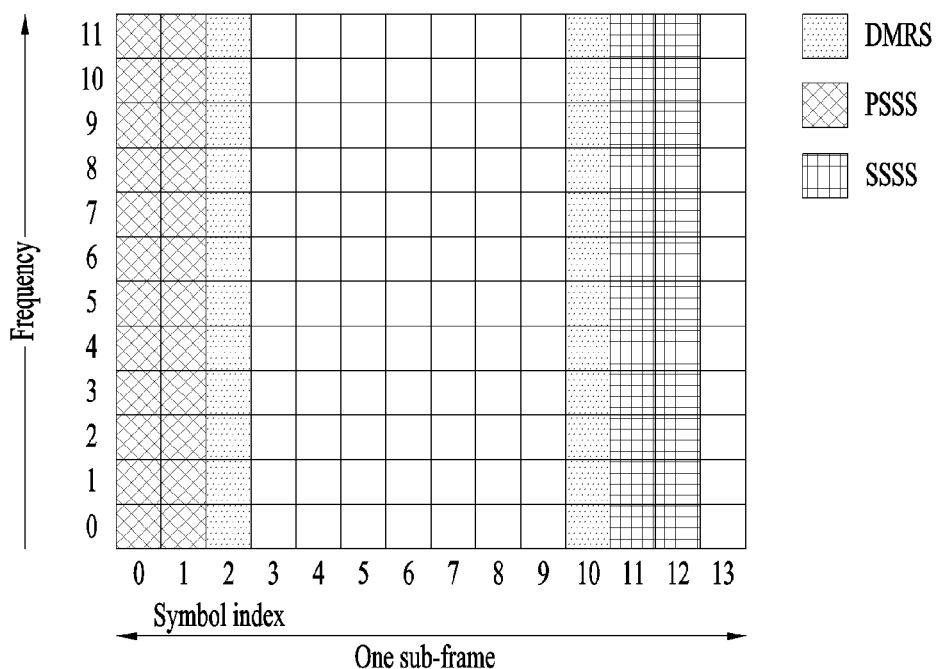

FIG. 11A shows the PSBCH structure of the LTE system in the case of the normal CP, and FIG. 11B shows the PSBCH structure in the case of the extended CP. In FIGS. 11A and 11B, each of the PSSS and SSSS is mapped to two symbols, and code [1 1] or [1 −1] may be applied to the two symbols. That is, a synchronization signal where the OCC is applied is combined with a DMRS sequence, and then the combination can be mapped to a synchronization signal ID.

Sixth Method

According to the sixth method of the present invention, when a comb type of sequence is used for a DMRS, combinations of information indicating whether even mapping or odd mapping is applied and DMRS sequences are mapped to synchronization signal IDs. When the even mapping is used, it is observed that the same half-length OFDM symbol is repeated in the time domain. On the other hand, when the odd mapping is used, it is observed that a second block of the half-length OFDM symbol has a negative sign in the time domain, i.e., its sign is inverted. That is, by comparing the observation results, a receiving UE can identify measurement.

Seventh Method

According to the seventh method of the present invention, both an SSS for subframe 0 (i.e., SFN #0) and an SSS for subframe 5 (i.e., SFN #5) are used to generate an SSSS, and combinations of information indicating whether subframe 0 or subframe 5 is used and DMRS sequences are mapped to synchronization signal IDs (in this case, an OCC may not be used).

Currently, an SSSS for subframe 0 is used in D2D communication. However, if an SSSS for subframe 5 is used together with the SSSS for subframe 0, 1 bit of information can be further generated. That is, the generated 1-bit information is combined with a DMRS sequence, and then the combination can be mapped to a synchronization signal ID.

Eighth Method

According to the eighth method of the present invention, a synchronization signal (PSSS and/or SSSS) can be used to identify a synchronization signal ID, and a DMRS can be used for measurement.

Further, according to the present invention, it is possible to use an SSS for subframe 5 in V2X communication in order to indicate that it is for global navigation satellite system (GNSS) synchronization or global positioning system (GPS) synchronization.

Alternatively, when the number of DMRS sequences is smaller than the number of synchronization signal IDs (synchronization IDs), it is possible to restrict the number of synchronization IDs below the number of DMRS sequences in order to measure synchronization through a DMRS. In other words, an eNB may set the number of IDs to be used for sidelink synchronization with reference to the number of available DMRSs and then inform UEs of this fact to prevent the UEs from performing unnecessary synchronization signal search. By doing so, even when the number of DMRS sequences is reduced, it is possible to achieve stable S-RSPR measurement.

When the method for sidelink synchronization measurement or method for changing SLSS/PSBCH formats proposed in the present invention is used, which one of the aforementioned methods (including the synchronization measurement method used in Rel.13 D2D) will be used could be determined in advance. For example, at a high frequency of 6 GHz, an OCC is not used because a phase offset caused by a frequency offset is large, and thus the number of DMRS sequences becomes insufficient. Accordingly, one of the aforementioned methods can be applied. Meanwhile, at a low frequency of 2 GHz, an OCC is used because a phase offset caused by a frequency offset is relatively small, and thus the number of DMRS sequences becomes greater than that of synchronization IDs. Thus, the synchronization measurement method used in Rel.13 D2D can be applied.

Alternatively, a network can inform UEs which one of the new synchronization measurement method (including the synchronization measurement method used in Rel.13 D2D) and method for changing SLSS/PSBCH formats will be used, through higher layer signaling (e.g., RRC or SIB).

To handle a case where a UE is out of network coverage, how the sidelink synchronization measurement should be performed or how an SLSS/PSBCH should be transmitted and measured may be determined in advance. For example, when a UE connected to the network is detached from the network, how the UE should perform the synchronization measurement can be informed the UE in advance through preconfiguration signaling.

Alternatively, an OCC may have two values instead of a fixed value. Table 5 shows the current PSBCH DMRS sequences, and in this case, three PSBCH DMRS symbols may be considered.

TABLE 5

| Parameter in clause 5.5.2.1 | | PSBCH |
|---|---|---|
| Group hopping | | disabled |
| | $f_{ss}$ | $[N_{ID}^{SL}/16] \bmod 30$ |
| Sequence hopping | | disabled |
| Cyclic shift | $n_{cs, \lambda}$ | $[N_{ID}^{SL}/2] \bmod 8$ |

TABLE 5-continued

| Parameter in clause 5.5.2.1 | | PSBCH |
|---|---|---|
| Orthogonal sequence | $[w^\lambda(0)\ w^\lambda(1)]$ | $[+1\ +1]$ if $N_{ID}^{SL}$ mod 2 = 0 |
| | | $[+1\ -1]$ if $N_{ID}^{SL}$ mod 2 = 1 |
| Reference signal length | $M_{sc}^{RS}$ | $M_{sc}^{PSBCH}$ |
| Number of layers | $\upsilon$ | 1 |
| Number of antenna ports | P | 1 |

In this case, using a discrete Fourier transform (DFT) matrix, the OCC for three DMRSs can be defined as follows.

$$\begin{bmatrix} 1 & 1 & 1 \end{bmatrix}$$
$$\begin{bmatrix} 1 & e^{j\frac{2\pi}{3}} & e^{j\frac{4\pi}{3}} \end{bmatrix}$$
$$\begin{bmatrix} 1 & e^{j\frac{4\pi}{3}} & e^{j\frac{8\pi}{3}} \end{bmatrix}$$

However, if all the above vectors are used, the CS, OCC, and base sequence in Table 5 should be modified by considering the vectors. To facilitate the implementation of the UE while maintaining the compatibility, only two among the three DFT vectors may be used for the OCC.

For example, the following two vectors may be used for the OCC.

$$\begin{bmatrix} 1 & 1 & 1 \end{bmatrix}$$
$$\begin{bmatrix} 1 & e^{j\frac{2\pi}{3}} & e^{j\frac{4\pi}{3}} \end{bmatrix}$$

As another example, the following two vectors may be used for the OCC.

$$\begin{bmatrix} 1 & 1 & 1 \end{bmatrix}$$
$$\begin{bmatrix} 1 & e^{j\frac{4\pi}{3}} & e^{j\frac{8\pi}{3}} \end{bmatrix}$$

As a further example, the following two vectors may be used for the OCC.

$$\begin{bmatrix} 1 & e^{j\frac{2\pi}{3}} & e^{j\frac{4\pi}{3}} \end{bmatrix}$$
$$\begin{bmatrix} 1 & e^{j\frac{4\pi}{3}} & e^{j\frac{8\pi}{3}} \end{bmatrix}$$

Figure 12:
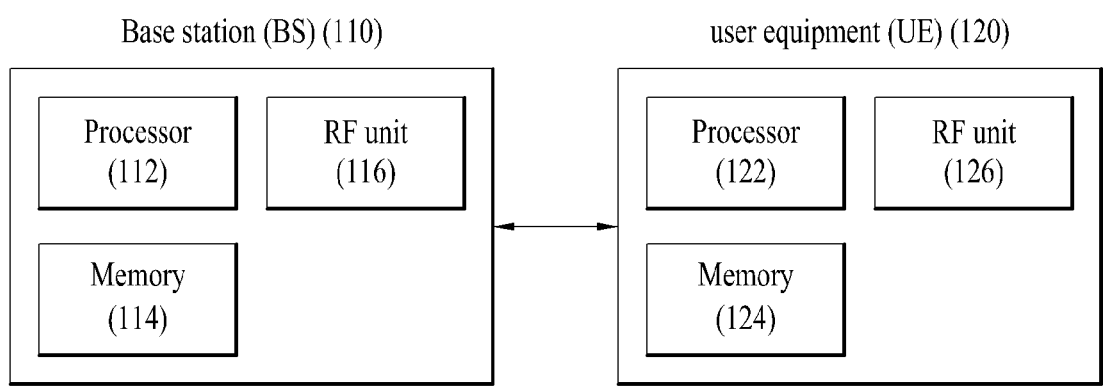
FIG. 12 illustrates a base station (BS) and a user equipment (UE) applicable to an embodiment of the present invention.

FIG. 12 illustrates a base station (BS) and a user equipment (UE) applicable to an embodiment of the present invention.

If a relay node is included in a wireless communication system, communication in a backhaul link is performed between the BS and the relay node and communication in an access link is performed between the relay node and the UE. Therefore, the BS or UE shown in the drawing can be substituted with the relay node in some cases.

Referring to FIG. 12, a wireless communication system includes a base station (BS) 110 and a user equipment (UE) 120. The base station 110 includes a processor 112, a memory 114 and an RF (radio frequency) unit 116. The processor 112 can be configured to implement the procedures and/or methods proposed in the present invention. The memory 114 is connected to the processor 112 and stores various kinds of information related to operations of the processor 112. The RF unit 116 is connected to the processor 112 and transmits and/or receives radio or wireless signals. The user equipment 120 includes a processor 122, a memory 124 and an RF unit 126. The processor 122 can be configured to implement the procedures and/or methods proposed in the present invention. The memory 124 is connected to the processor 122 and stores various kinds of information related to operations of the processor 122. The RF unit 126 is connected to the processor 122 and transmits and/or receives radio or wireless signals. The base station 110 and/or the user equipment 120 can have a single antenna or multiple antennas.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

In this disclosure, a specific operation explained as performed by a base station can be performed by an upper node of the base station in some cases. In particular, in a network constructed with a plurality of network nodes including a base station, it is apparent that various operations performed for communication with a user equipment can be performed by a base station or other network nodes except the base station. In this case, 'base station' can be replaced by such a terminology as a fixed station, a Node B, an eNodeB (eNB), an access point and the like.

The embodiments of the present invention may be implemented using various means. For instance, the embodiments of the present invention may be implemented using hardware, firmware, software and/or any combinations thereof. In case of the implementation by hardware, one embodiment of the present invention may be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then driven by a processor.

The memory unit may be provided within or outside the processor to exchange data with the processor through the various means known to the public.

It will be apparent to those skilled in the art that the present invention can be embodied in other specific forms without departing from the spirit and essential characteristics of the invention. Thus, the above embodiments are to be considered in all respects as illustrative and not restrictive.

The scope of the invention should be determined by reasonable interpretation of the appended claims and all change which comes within the equivalent scope of the invention are included in the scope of the invention.

INDUSTRIAL APPLICABILITY

The method of measuring power for V2V communication in a wireless communication system and device for the same can be applied to various wireless communication systems.

The invention claimed is:

1. A method for communicating for vehicle-to-everything (V2X) communication, the method comprising:
mapping a synchronization signal and a demodulation reference signal (DMRS) associated with a physical sidelink broadcast channel (PSBCH) in a time domain unit for the V2X communication; and
transmitting a signal comprising the synchronization signal and the DMRS to a receiving end,
wherein the DMRS is mapped to resource elements on three symbols in the time domain unit,
wherein the DMRS uses a first orthogonal cover code (OCC) when an identifier of the synchronization signal is even,
wherein the DMRS uses a second OCC when the identifier of the synchronization signal is odd, and
wherein the DMRS uses the identifier of the synchronization signal divided by 2 as a cyclic shift parameter.

2. The method of claim 1, wherein the first OCC corresponds to [1 1 1], and wherein the second OCC corresponds to a phase shifted code of the first OCC.

3. The method of claim 1, wherein the time domain unit corresponds to a subframe.

4. The method of claim 1, wherein three components of the first OCC or the second OCC are respectively applied to the three symbols in the time domain unit.

5. The method of claim 1, wherein the PSBCH is mapped with the DMRS in the time domain unit.

6. A device for communicating for vehicle-to-everything (V2X) communication, the device comprising:
a processor;
a memory coupled with the processor and storing information to operate the processor; and
a radio frequency (RF) transmitter coupled with the processor,
wherein the processor is configured for:
mapping a synchronization signal and a demodulation reference signal (DMRS) associated with a physical sidelink broadcast channel (PSBCH) in a time domain unit for the V2X communication; and
transmitting a signal comprising the synchronization signal and the DMRS to a receiving end,
wherein the DMRS is mapped to resource elements on three symbols in the time domain unit,
wherein the DMRS uses a first orthogonal cover code (OCC) when an identifier of the synchronization signal is even,
wherein the DMRS uses a second OCC when the identifier of the synchronization signal is odd, and
wherein the DMRS uses the identifier of the synchronization signal divided by 2 as a cyclic shift parameter.

7. The device of claim 6, wherein the first OCC corresponds to [1 1 1], and wherein the second OCC corresponds to a phase shifted code of the first OCC.

8. The device of claim 6, wherein the time domain unit corresponds to a subframe.

9. The device of claim 6, wherein three components of the first OCC or the second OCC are respectively applied to the three symbols in the time domain unit.

10. The device of claim 6, wherein the PSBCH is mapped with the DMRS in the time domain unit.

* * * * *